(12) United States Patent
Yu et al.

(10) Patent No.: US 7,377,103 B2
(45) Date of Patent: May 27, 2008

(54) SYSTEM AND METHOD FOR CONTROLLING AN ENGINE HAVING A POWER TAKE OFF OUTPUT DEVICE

(75) Inventors: Songping Yu, Troy, MI (US); Thomas M. Luther, Brighton, MI (US); Michael J. Cullen, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 181 days.

(21) Appl. No.: 11/176,174

(22) Filed: Jul. 7, 2005

(65) Prior Publication Data

US 2007/0006572 A1 Jan. 11, 2007

(51) Int. Cl.
*F01N 3/00* (2006.01)
*B60K 15/00* (2006.01)
*B60K 25/00* (2006.01)

(52) U.S. Cl. .................... 60/286; 60/285; 180/69.3; 180/53.1

(58) Field of Classification Search ................ 123/350, 123/352, 357, 361, 376; 701/93, 110; 180/53.1, 180/53, 69.3; 60/285, 286
See application file for complete search history.

(56) References Cited

U.S. PATENT DOCUMENTS

| | | | | |
|---|---|---|---|---|
| 1,557,628 A | * | 10/1925 | Sweet | 74/15.86 |
| 2,690,712 A | * | 10/1954 | Foote | 417/34 |
| 4,024,711 A | * | 5/1977 | Russell, Jr. | 60/423 |
| 4,372,265 A | | 2/1983 | Kasiewicz | |
| 4,920,813 A | * | 5/1990 | Willford | 74/11 |
| 5,243,819 A | * | 9/1993 | Woerner et al. | 60/274 |
| 5,310,974 A | * | 5/1994 | Churchill et al. | 200/566 |
| 5,480,364 A | | 1/1996 | Hilbert et al. | |
| 5,494,142 A | * | 2/1996 | Kale | 192/12 C |
| 5,517,965 A | * | 5/1996 | Notsu et al. | 123/352 |
| 5,560,199 A | * | 10/1996 | Agustin et al. | 60/274 |
| 5,562,173 A | * | 10/1996 | Olson | 180/53.4 |
| 5,592,029 A | * | 1/1997 | Hollstein et al. | 307/9.1 |
| 5,611,751 A | * | 3/1997 | Ehrenhardt et al. | 477/73 |
| 5,642,711 A | * | 7/1997 | Boner et al. | 123/379 |
| 5,740,044 A | * | 4/1998 | Ehrenhardt et al. | 701/87 |
| 5,806,640 A | * | 9/1998 | Kale | 192/12 C |
| 6,019,702 A | | 2/2000 | Ehrenhardt et al. | |
| 6,045,485 A | * | 4/2000 | Klinger et al. | 477/203 |
| 6,205,385 B1 | * | 3/2001 | Stelzle et al. | 701/50 |
| 6,267,189 B1 | * | 7/2001 | Nielsen et al. | 180/53.1 |
| 6,517,465 B2 | * | 2/2003 | Hrazdera | 477/174 |
| 6,637,191 B1 | * | 10/2003 | Ziemba et al. | 60/274 |
| 7,048,106 B2 | * | 5/2006 | Hou | 192/103 F |
| 7,101,312 B2 | * | 9/2006 | Bauerle et al. | 477/111 |
| 2006/0191359 A1 | * | 8/2006 | Tarasinski et al. | 74/11 |

OTHER PUBLICATIONS

Marks' Standard Handbook For Mechanical Engineers (10th Edition), Avallone, E.A: Baumeister, T.,III 1996 McGraw-Hill, pp. 11-6-11-10.*

* cited by examiner

*Primary Examiner*—Thomas Denion
*Assistant Examiner*—Loren Edwards
(74) *Attorney, Agent, or Firm*—Donald J. Lewis; Allan J. Lippa

(57) ABSTRACT

A system and method for controlling a power take off device connected to an internal combustion engine is presented. According to the method, power take off speed control may be improved and the possibility of engine stalling may be reduced.

25 Claims, 4 Drawing Sheets

SYSTEM AND METHOD FOR CONTROLLING AN ENGINE HAVING A POWER TAKE OFF OUTPUT DEVICE

FIELD

The present description relates to a method for controlling an internal combustion engine having a power take off device for powering external loads.

BACKGROUND

One method to control an internal combustion engine and a power take off device is described in U.S. Pat. No. 5,611,751. This method presents a means to control transitions between first and second operating modes. In the first operating mode, engine power is inhibited from the power take off (PTO) device output. In the second operating mode, at least a portion of engine power is permitted to flow to the PTO device output. The method controls transitions between operating modes based on operator input to several switches.

In another aspect of the before-mentioned patent, a method is provided to enter an operating mode where engine power flows to a PTO device output, after operating in a mode where engine power is inhibited from the PTO device output. This method allows an operator to manually set a target engine speed by depressing an accelerator or by pressing a resume switch which allows an engine controller to read a previous engine speed operating point from memory and then use the previous engine speed as a target engine speed.

The above-mentioned methods can also have disadvantages. Namely, the method can transition from one operating mode to another, in response to operator inputs, without regard to the PTO load or engine torque capacity. In other words, if an operator fails to follow a specific power take off operating sequence, he or she may cause the engine to stall since the PTO may be engaged to the engine at a lower engine operating speed where the amount of available engine torque may be less than an amount necessary to turn the engine and the PTO load. Further, controlling the engine based on a single PTO operating condition, namely, PTO speed, can result in transient engine air-fuel errors and deviation from the desired engine speed during mode or operating point transitions.

The inventors herein have recognized the above-mentioned disadvantages and have developed a system and method that offers substantial improvements over previous systems and methods.

SUMMARY

One embodiment of the present description includes a system to control an internal combustion engine having a power take off device that can be coupled to the internal combustion engine, the system comprising: an internal combustion engine; a power take off device that may be coupled to said internal combustion engine, said power take off device having an output for selectively delivering at least a portion of engine power to an ancillary device; and a controller to adjust a power take off operating parameter at a first operating condition in response to a first input, said operating parameter adjustment acting to increase the torque capacity of the engine, indicating that said engine is ready for a PTO load in response to said adjustment, and controlling the PTO in response to a second input after said indication that said engine is ready for a PTO load.

By automatically moving an engine operating point from a lower torque capacity to a higher torque capacity, before engaging the engine to a power take off device output, it may be possible to reduce engine stalling during power take off device engagement. For example, an engine controller may be designed to automatically transition from an idle speed mode to a standby mode in response to the commands of an operator or a controller. After completing the transition to standby mode the engine and PTO controller can provide a "PTO ready" indication to an operator or the controller of a PTO powered apparatus. Then, the engine and PTO controller can monitor inputs for a "PTO loaded" indication. Upon determining that the PTO is loaded the engine and PTO controller may enter the PTO control mode. Controlling the engine and PTO in this manner may reduce engine stalling since the complexity of operator managed steps may be reduced and since engagement of PTO powered apparatuses may be limited to an engine operating region having increased torque capacity.

By including a mode that can prepare the engine for a PTO load engagement, before the operator engages the PTO load, engine stalls that occur because of engaging a PTO load may be reduced. Specifically, the possibility of engine stalling may be reduced by elevating engine speed to a predetermined level, where the engine may be capable of providing additional torque, before signaling the operator that the engine is ready for a PTO load.

Another embodiment of the present description includes a method to control an internal combustion engine having a power take off device that can be coupled to the internal combustion engine, the method comprising: operating an internal combustion engine and a power take off device between at least two modes, a first mode wherein said internal combustion engine does not deliver engine power to a power take off device output, and a second mode wherein said internal combustion engine can deliver power to said power take off device output; and adjusting at least an engine or power take off control parameter, during or after a transition from said first mode to said second mode, in response to at least engine load during a previous operation in said second mode.

A PTO device may be routinely engaged and disengage to the engine during the course of operating a PTO powered apparatus. By storing control parameters that may reflect PTO loading (e.g., engine load) from a previous PTO operating period, it may be possible to improve PTO speed control. For example, a particular PTO powered apparatus may use 25% of available engine load at 2700 RPM to maintain the apparatus at a rated device speed of 540 RPM while another apparatus uses 60% of available engine torque. If the PTO is controlled by merely responding to engine and/or PTO speed, it may be difficult for the controller to follow a desired engine speed. However, it may be possible to control engine actuators (e.g., throttle position, spark advance, and/or injector timing) based on a priori engine and/or PTO load information so that the PTO device output speed more closely follows a desired speed.

The present description may provide several advantages. Namely, the above mentioned system may reduce the possibility of engine stalling when a PTO load is engaged to an engine. By presetting the engine to an operating point that may provide increased engine torque during a PTO load engagement it may be possible to reduce engine stalling. In addition, the above mentioned method may be used to improve PTO speed control during engagement of a PTO load. Furthermore, engine transient air-fuel control may be improved during mode transitions since prior engine operating conditions may be used to anticipate an expected PTO load.

The above advantages and other advantages, and features of the present description will be readily apparent from the following Detailed Description when taken alone or in connection with the accompanying drawings.

BRIEF DESCRIPTION OF THE DRAWINGS

The advantages described herein will be more fully understood by reading an example of an embodiment, referred to herein as the Detailed Description, when taken alone or with reference to the drawings, wherein.

DETAILED DESCRIPTION

Figure 1:
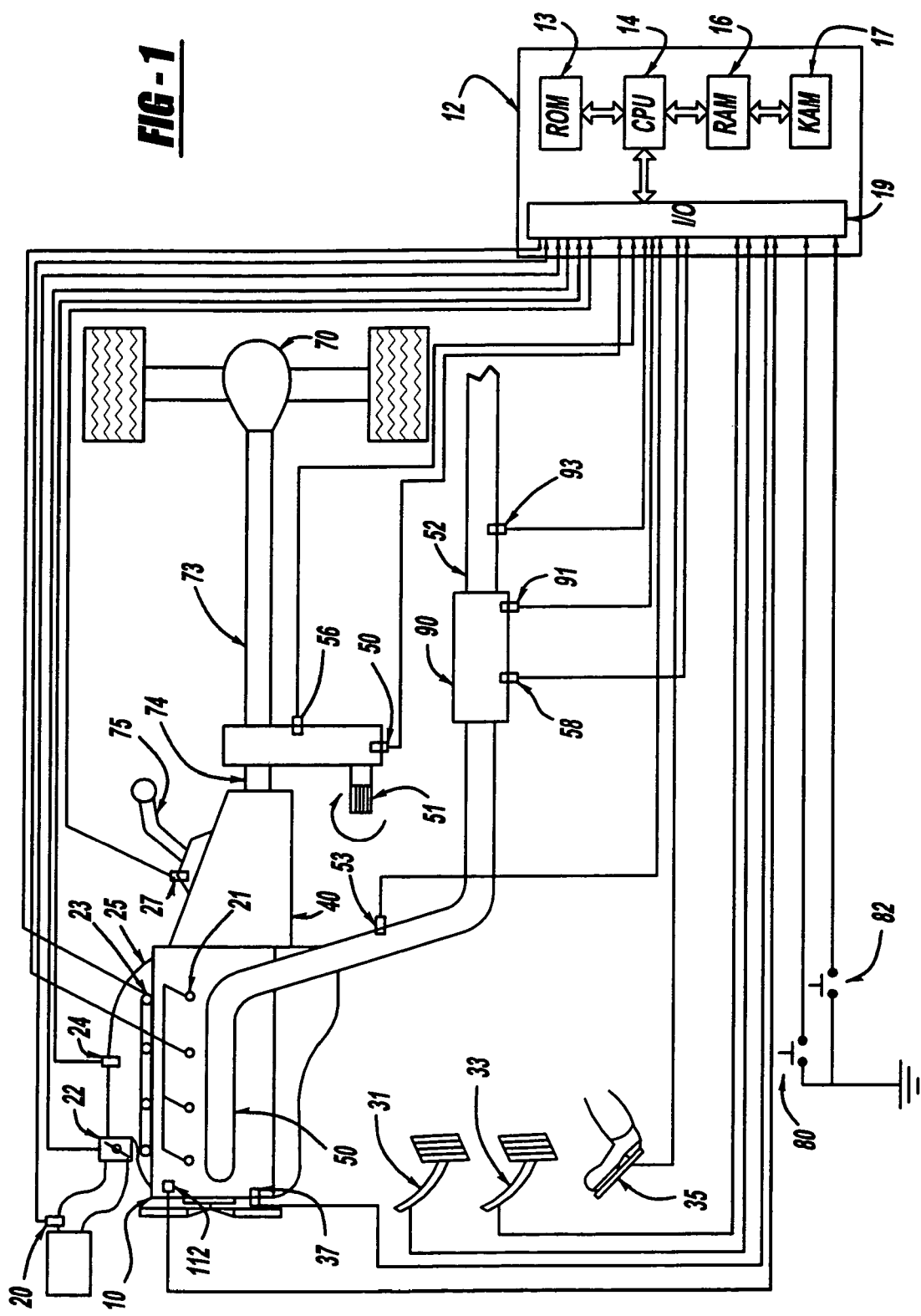
FIG. 1 is a schematic diagram of a vehicle drivetrain that includes a power take off device and associated controls.

Referring to FIG. 1, internal combustion engine 10, comprising a plurality of cylinders, is controlled by electronic engine controller 12. Engine 10 includes cylinders that are in communication with intake manifold 25 and exhaust manifold 50 via respective intake and exhaust valves (not shown).

Intake manifold 25 is also shown having fuel injector 23 coupled thereto for delivering liquid fuel in proportion to the pulse width from controller 12. Fuel is delivered to fuel injector 23 by fuel system (not shown) including a fuel tank, fuel pump, and fuel rail (not shown). Alternatively, the engine may be configured such that the fuel is injected directly into the engine cylinder, which is known to those skilled in the art as direct injection. Intake manifold 25 is also shown communicating with electronic throttle 22 which may be used to control inducted air amount.

A distributorless ignition system (not shown) provides ignition spark to combustion chamber via spark plug 21 in response to controller 12. In diesel embodiments, spark plug 21 may be replaced by a glow plug to assist cold start combustion. Universal Exhaust Gas Oxygen (UEGO) sensor 53 is shown coupled to exhaust manifold 50 upstream of catalytic converter 90. Alternatively, a two-state exhaust gas oxygen sensor may be substituted for UEGO sensor 53. Two-state exhaust gas oxygen sensor 93 is shown coupled to exhaust pipe 52 downstream of catalytic converter 70. Alternatively, sensor 98 can also be a UEGO sensor. Catalytic converter temperature is measured by temperature sensor 77, and/or estimated based on operating conditions such as engine speed, load, air temperature, engine temperature, and/or airflow, or combinations thereof.

Converter 70 can include multiple catalyst bricks, in one example. In another example, multiple emission control devices, each with multiple bricks, can be used. Converter 70 can be a three-way type catalyst in one example. Alternatively, the converter may include a NOx trap, Hydrocarbon trap, particulate filter, oxidation catalyst, and/or a selective oxidation catalyst.

Manual transmission 40 is coupled to engine 10 for transferring engine crankshaft torque to drive axle 70 via intermediate shaft 74, transfer case 50, and drive shaft 73. Alternatively, an automatic transmission may be coupled to engine 10 if desired. Transfer case 50 may selectively deliver engine power to driveshaft 73 and/or power take off spline shaft 51 in response to engine controller signals via an electronically controlled transfer case clutch mechanism 56. Furthermore, alternate PTO design choices are anticipated such that the example illustrated in FIG. 1 is not intended to limit the scope or breadth this description. Gear position is determined by gear position sensor 27 in response to gear position selector 75. The PTO may be used to power hydraulic pumps, hydraulic motors, compressors and a variety of other devices that are not intended to limit the scope or breadth of this description.

Controller 12 is shown in FIG. 1 as a conventional microcomputer including: microprocessor unit 14, input/output ports 19, and read-only-memory 13, random-access-memory 16, 17 Keep-alive-memory, and a conventional data bus. Controller 12 is shown receiving various signals from sensors coupled to engine 10, in addition to those signals previously discussed, including: engine coolant temperature (ECT) from temperature sensor 112 coupled to a cylinder water jacket; a position sensor 35 coupled to a accelerator pedal; a position sensor 33 coupled to a clutch pedal; a position sensor 31 coupled to a brake pedal; a measurement of engine manifold pressure (MAP) from pressure sensor 24 coupled to intake manifold 25; a PTO request switch 80; a PTO load engaged switch 82; an exhaust pressure sensing device 58; a measurement (ACT) of engine air amount temperature or manifold temperature from temperature sensor 20; and a engine position sensor from a Hall effect sensor 37 sensing crankshaft position. In a preferred aspect of the present description, engine position sensor 37 produces a predetermined number of equally spaced pulses every revolution of the crankshaft from which engine speed (RPM) can be determined.

Figure 2:
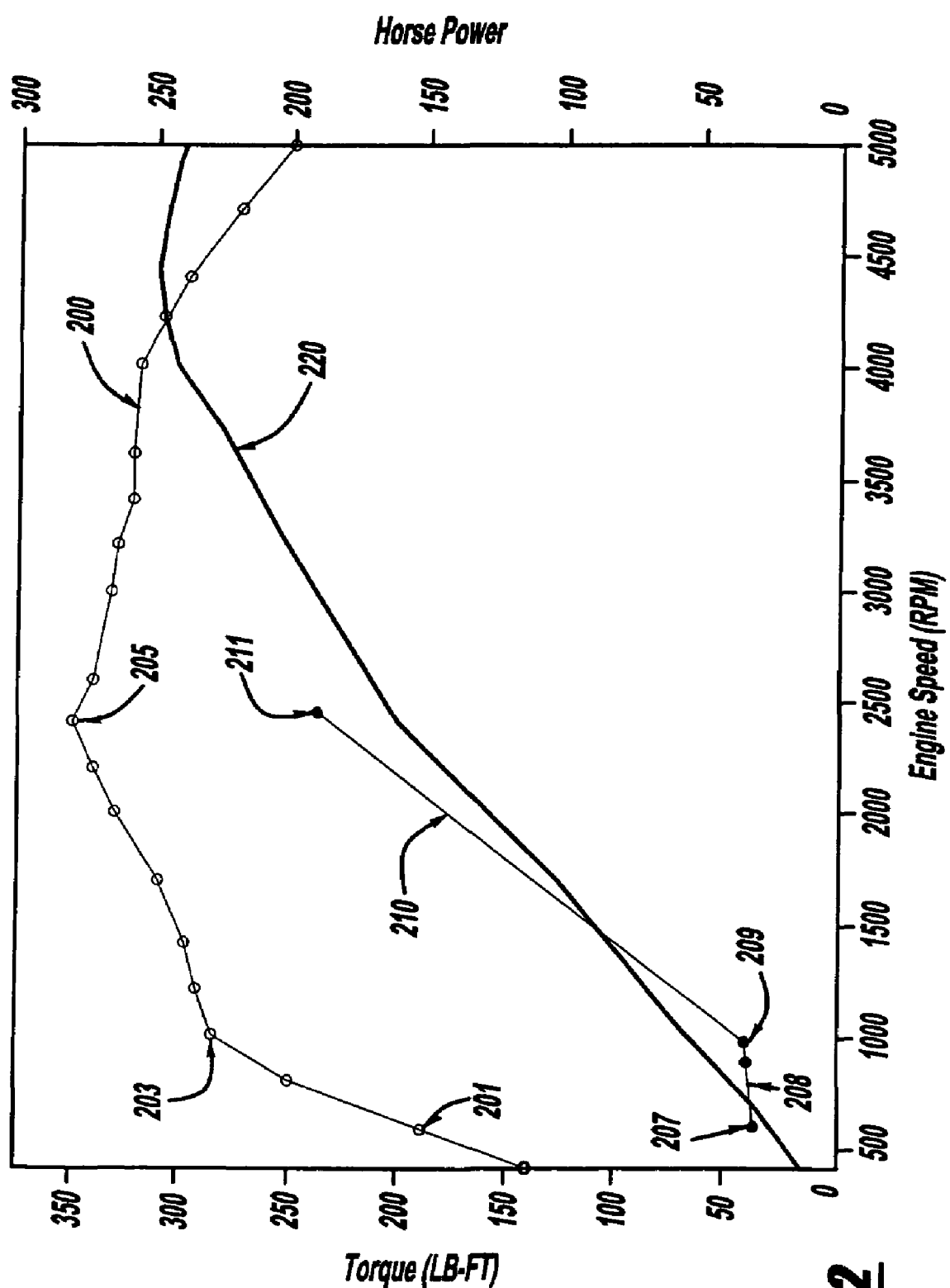
FIG. 2 is an illustration of an example internal combustion engine torque curve that shows example engine operating points for several power take of control modes.

Referring to FIG. 2, an illustration of an example internal combustion engine torque curve and horse power curve is shown. The x axis of the graph is comprised of equally spaced marks that identify selected engine speed points. The left-hand Y axis represents engine torque in units of LB-FT. The right-hand Y axis represents engine power in units of Horse Power (HP). Curves 200 and 220 define the respective engine torque and horse power limits for an example engine over a range of engine speed. The area below curve 200 represents engine torque that may be available by varying engine spark angle as well as air and fuel amounts, for example. The area above the torque curve represents torque that is beyond the engine capacity. Torque curve 200 shows that engine torque increases from approximately 400 RPM to about 2500 RPM and decreases thereafter. The trend of decreasing torque continues for speeds below 400 RPM (not shown). Correspondingly, the area below curve 220 represents engine horse power that may be available from this example engine while the area above the curve represents power that is beyond the engine capacity. Horse power monotonically increases from 400 RPM to 4500 RPM and decreases thereafter.

Engine operating points 201, 203, and 204 represent available engine torque at three example engine speeds. Point 201 may be used to illustrate an engine torque limit for an engine operating point at an example 600 RPM idle condition. This operating point can be used to show that lower engine torque may be available at lower engine speeds. For example, from FIG. 2, at 600 RPM available engine torque is approximately 190 LB-FT, at 1000 RPM available engine torque is approximately 290 LB-FT, and at 2500 RPM available engine torque is approximately 350

LB-FT. Consequently, an engine operating at a lower speed may not be able to sufficiently power a certain PTO load. The reduced torque level may result from valve timing limitations or because the interval between torque producing cylinder events increases at lower engine speeds. Nonetheless, engine torque capacity can be increased by moving the engine speed to an operating point left of 201, namely, point 203, thereby reducing the possibility of engine stalling when a PTO load is engaged.

Point 203 represents a torque limit for one possible standby mode operating point at 1000 RPM. Engine torque capacity is increased by approximately 95 LB-FT over point 201.

Point 205 represents a torque limit for an engaged PTO control mode operating point at 2500 RPM. Engine torque capacity can be increased by approximately 55 LB-FT over point 203. In contrast, available engine power can be increased by nearly 150 HP from point 203 to point 205.

An example PTO to engine engagement sequence can be explained with reference to points 207, 209, and 211. At point 207 an engine may idle waiting for a driver demand or a request to operate the PTO, herein referred to as "idle mode." When a PTO request is made and logical conditions for standby mode have been met, the engine speed may be increased from point 207 to point 209, for example. Line segment 208 illustrates one example trajectory that can be used to transition from idle mode to standby mode. At point 209, the PTO device output is disengaged from the engine and the engine speed is controlled to a predetermined level while control logic monitors operating conditions to determine if idle mode or PTO control mode should be entered, herein referred to as "standby mode." By transitioning from point 207 to point 209 engine torque capacity may be increased. This can be illustrated by taking the torque difference between the available engine torque at 1000 RPM, point 203, and the available engine torque at 600 RPM, point 201. If operating conditions are sufficient to enter PTO control mode from standby mode, the engine operating point moves to point 211, for example. Upon indication of an engaged PTO load (i.e., a load that may resist PTO shaft rotation as opposed to a free wheeling PTO shaft), the PTO output may be enabled and engine power may be delivered to a PTO powered apparatus. Line segment 210 illustrates an example trajectory for transitioning between standby mode and PTO control mode.

In another embodiment that includes a turbo charged diesel as the internal combustion engine, engine torque can increase between a first low engine speed and a second higher engine speed in a similar manner as described by curve 200. Specifically, at lower engine speeds (e.g., 700 RPM) a turbo charger may not be able to compress as much air entering the engine as when the engine speed is at a higher engine speed (e.g., 1600 RPM). Consequently, less engine torque may be available at lower engine speed than at a higher engine speed. In this embodiment, the standby engine speed may be selected to be at a predetermined level where the turbo charger operates with increased efficiency. In this way, the amount of available torque can be increased for a turbo charged engine, prior to PTO load engagement.

Figure 3:
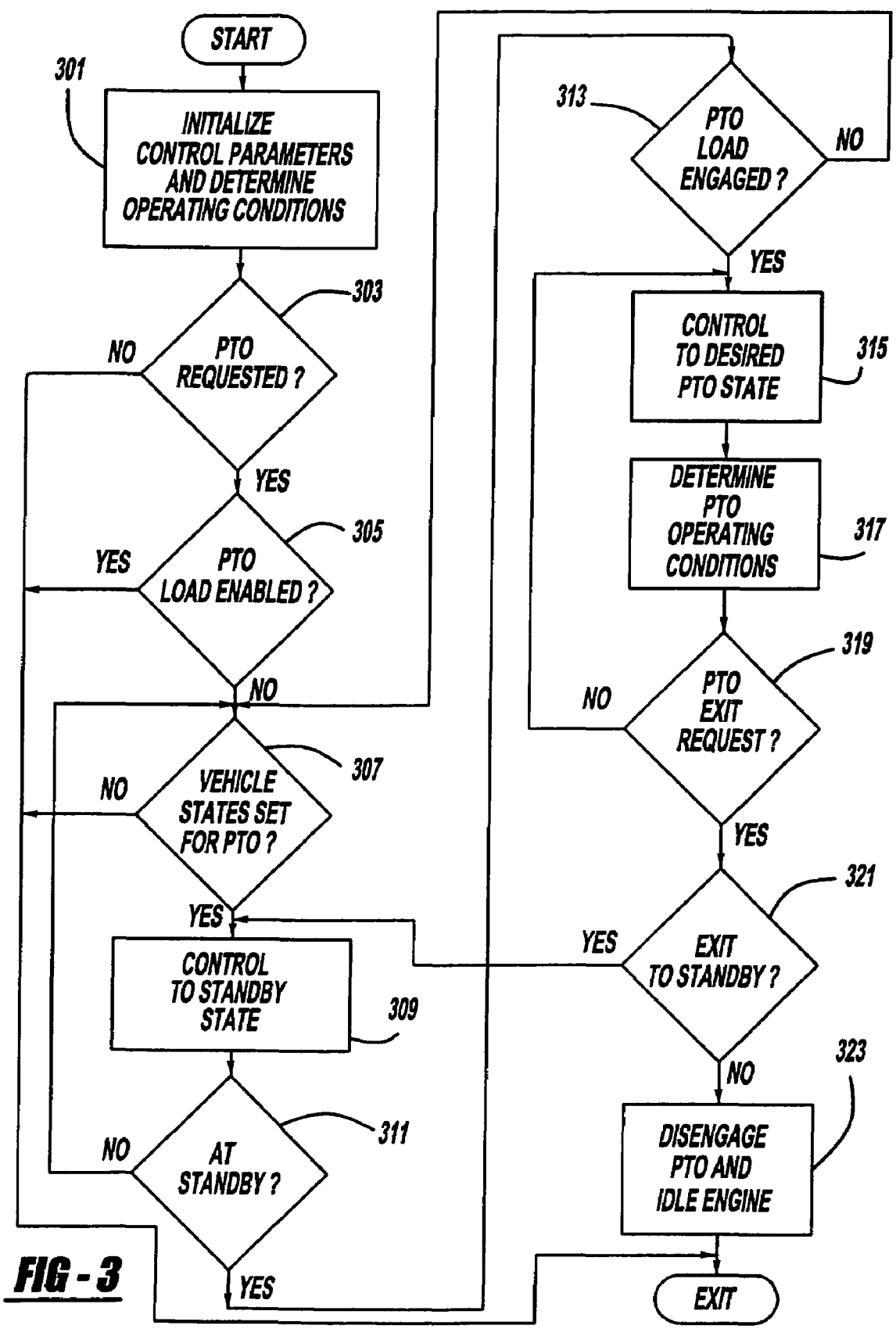
FIG. 3 is an example flow chart of a method to control engine and power take off control modes.

Referring to FIG. 3, an example flow chart of a method to control engine and power take of control modes is shown. A PTO is designed to power external ancillary loads that are not part of base engine system. For example, components that are driven or powered by a front end accessory drive such as an air conditioning compressor, vacuum pump, alternator, or power steering pump are not usually controlled and/or driven by a PTO. Rather, a PTO may be designed to power a log splitter, garbage compressor, dump truck lift, or conveyer belt, for example. The operating speed for these devices may be varied, but in many cases the devices may be operated at a fixed PTO speed.

In step 301, engine and PTO control variables may be initialized. Further, engine and PTO operating conditions may be determined. For example, controller parameters may be retrieved from memory and used to seed controller gains, for example. In addition, the operating states of brake pedal sensor 31, clutch pedal sensor 33, accelerator pedal sensor 35, gear position sensor 27, catalyst temperature sensor 91, PTO request switch 80, exhaust pressure 58, and PTO load engaged switch 82 may be determined. The routine proceeds to step 303.

In step 303, a determination is made as to whether PTO mode is requested. Specifically, the state of PTO mode request switch 80 is assessed. If PTO mode is requested the routing proceeds to step 305, if not, the routine proceeds to exit so that the engine may be in idle mode or may be able to respond to operator demands.

In step 305, a determination of whether a PTO load is engaged is made. By determining if a PTO load is engaged to the PTO output shaft 51, before the PTO is engaged to the engine, it may be possible to reduce engine stalls. For example, as described in the description of FIG. 2, if a PTO load is coupled to an engine that is operating at a low engine speed, engine torque may be lower than the available engine torque at a slightly higher engine speed. Therefore, in step 305, PTO engagement switch 82 is monitored so that the possibility of coupling the engine to an engaged PTO load at a low engine torque operating condition may be reduced, thereby reducing the possibility of an engine stall. Alternative methods to assess PTO engagement are also envisioned. For example, a signal may be sent from the PTO powered apparatus and input to engine controller 12 or engine controller 12 may use various engine and/or PTO sensors to infer PTO load engagement. If a PTO load is engaged the routine proceeds to exit without engaging the PTO output. If a PTO load is not engaged the routine proceeds to step 307.

In step 307, the routine determines if vehicle states are set for a PTO engagement. Before the PTO output shaft may be allowed to power a PTO load, vehicle operating conditions can be assessed so that the possibility of an unwanted PTO engagement may be reduced. Vehicle operating conditions may include vehicle speed, clutch position, brake position, engine temperature, catalyst temperature, exhaust pressure, pressure drop across an exhaust gas after treatment device, transmission gear, engine speed, and other parameters that may be useful for deciding if PTO engagement should be allowed. Operator inputs may also be queried in this step to determine if an operator initiated exit request has been made. Further, PTO control logic may be designed so that a certain predetermined sequence of events may have to be demonstrated before PTO engagement occurs. For example, an operator may have to set several switches or vehicle operating conditions in a specific order before the PTO may be allowed to engage. If vehicle states are set for PTO engagement the routine proceeds to step 309, if not, the routine exits. Further, if the engine and PTO have been in standby mode, and vehicle states no longer allow standby mode, the engine speed may be set to idle speed.

In step 309, the routine controls the engine and PTO to a standby state. Engine speed may be ramped or gradually increased from idle speed to a predetermined speed that may increase the amount of available engine torque. Engine speed may be increased by adjusting electronic throttle 22, spark advance, and/or fuel amount, for example. A proportional controller, proportional/integral controller, linear quadratic regulator, or another known control method may be used to control engine speed. The routine proceeds to step 311.

In step 311, the routine determines if standby mode operating conditions have been met. If engine speed is at or near a predetermined desired standby engine speed the routine proceeds to step 313. Alternatively, different vehicle operating conditions may be used to assess if the vehicle has reached conditions for standby mode. For example, engine speed may be used with various combinations of engine load, spark advance, and fuel amount to determine if the engine and PTO are at standby conditions. In still another embodiment, engine speed may not be used to determine if the engine and PTO are in standby mode. Rather, another operating condition, such as engine load, may be used in place of engine speed, for example. If the engine and PTO are at standby conditions the operator may be prompted by a light or controller screen indication to engage a PTO load and the routine proceeds to step 313, if not, the routine returns to step 307.

In step 313, the routine determines if a PTO load is be engaged. If a PTO load is be engaged the routine proceeds to step 315, if not, the routine returns to step 307. In other words, once the engine and PTO enter standby mode, standby mode may be maintained until a loaded PTO condition may be determined or until operating conditions cause the routine to return to idle mode.

In step 315, the engine and PTO are controlled to a desired PTO operating state. After receiving an indication that a load has been applied to the PTO the engine and PTO may leave standby conditions and proceed to a desired engine PTO operating point. Namely, the engine output may be coupled to the PTO device output so that the loaded PTO may begin to be driven and controlled by the engine. A control algorithm executed in processor 12 can adjust cylinder fuel amounts, cylinder air amounts, and/or spark advance so that the desired engine and PTO operating conditions may be achieved. In one example, a proportional and integral controller can adjust electronic throttle 22 so that the PTO output may be follow a desired speed. In another embodiment, a proportional controller can adjust cylinder fuel amount for a diesel engine so that the PTO output may follow a desired speed. Further, cylinder air amount, cylinder fuel amount, and/or spark may also be adjusted in a coordinated manner so that desired engine and PTO operating conditions may be achieved.

A variety of control options exist for controlling engine and PTO operating conditions. For example, a proportional/integral/derivative controller, state space regulator, or a fuzzy controller may be used as alternate ways to control the engine and PTO. One possible controller option is described by FIG. 4. Each of the before-mentioned control methods may use closed loop feedback to adjust controller gains and/or model parameters. These gains and/or parameters may be stored in memory and may be used during a subsequent engine and PTO control mode. For example, for a PI controller that adjusts at least throttle position to control engine speed, feed-forward control parameters and learned integral gains may be stored in memory. Tables or functions that may be indexed by operating parameters such as time since PTO engagement and engine coolant temperature, for example, may provide a variety of gains and/or control parameters so that the engine and PTO control may be improved. In one example, these previously learned parameters can improve the ability of a controller to follow a desired speed command. The routine continues to step 317.

In step 317, engine and PTO operating conditions may be determined. While the engine and PTO are in operated in PTO control mode, various operating states may be monitored so that PTO control mode may be exited if operating conditions have degraded. Monitored operating conditions may include but are not limited to catalyst temperature, exhaust pressure, pressure drop across and exhaust gas after treatment device, engine coolant temperature, engine oil pressure, PTO temperature, and PTO oil pressure. These operating conditions can be compared to predetermined amounts so that conditions that may deteriorate the engine and/or PTO may be reduced. For example, it may be desirable to reduce the amount of time a catalyst may operate at a certain temperature. If a measured or inferred catalyst temperature is above a predetermined temperature the engine and PTO may be transferred from PTO control mode to standby mode or to idle mode. Further, a signal such as a light or audible noise may be used to give notice for a predetermined amount of time to the operator that the engine and PTO may soon be exiting PTO control mode. In another embodiment, a diesel engine having a NOx trap and/or particulate filter may change from PTO control mode to standby mode or idle mode in response to an exhaust pressure and/or a pressure drop across an exhaust gas after treatment device that may be indicative of a filled or partially filled particulate filter. Furthermore, the output of an oxygen sensor, hydrocarbon sensor, or NOx sensor may be used to change from PTO control mode to idle mode or standby mode. The routine continues to step 319.

In step 319, the routine looks to see if there is a request to exit PTO control mode. PTO control mode may be exited by an operator request such as by changing the state of the PTO request switch or by PTO control logic. As mentioned above, various engine and PTO sensors may be monitored to determine degradation of an engine or PTO component, if degradation is determined PTO control mode may proceed to exit by moving to step 321. If an exit request has not been made the routine returns to step 315.

In step 321, the routine determines a PTO control mode exit method. If operator commands or control logic request exit to standby mode the routine returns to step 309. If the engine and PTO are transitioning from PTO control mode to standby mode, engine speed may be gradually reduced until the standby engine speed may be reached. In addition, the PTO output may be disengaged as soon as the mode change is initiated. If a request is made to exit to idle mode, the routine proceeds to step 323.

In step 323, the engine and PTO are prepared to enter idle mode. To transition from PTO control mode to idle mode, the PTO output is disengaged and the engine speed is reduced. Engine speed may be reduced by throttling, retarding spark, and/or cylinder fuel amounts, for example. The routine returns to exit.

Figure 4:
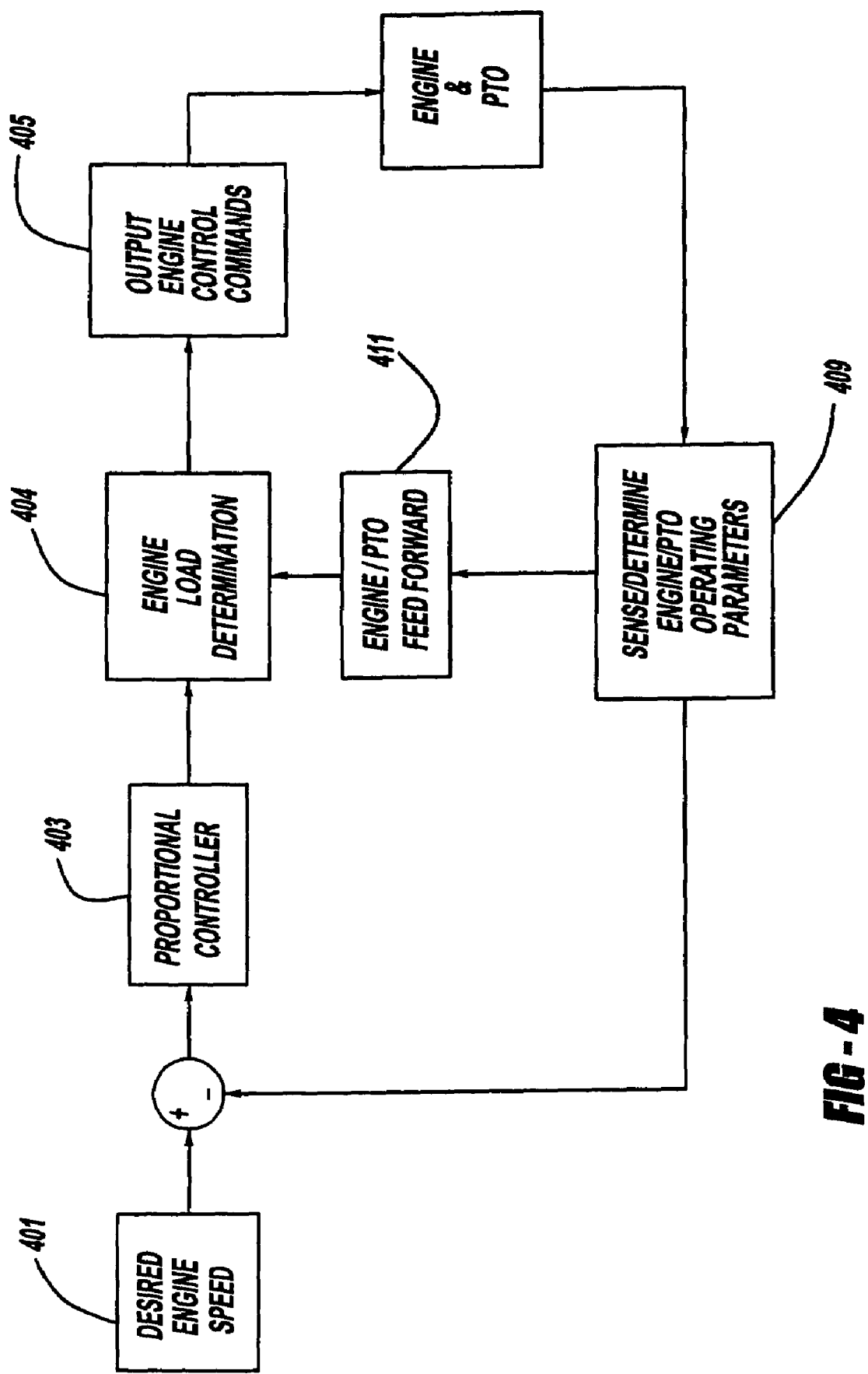
FIG. 4 is a block diagram of an example engine and power take off control method.

Referring to FIG. 4, a block diagram of an example PTO speed controller is shown. In block 401, desired engine speed is used as the PTO target control point. Alternatively, PTO output speed may be used as the PTO target control point. The control point may be determined from an operator key pad instructions or by sensing a potentiometer, for example. The actual engine speed is subtracted from the target control point to produce an error signal at summing junction 402. The error signal is passed to block 403 where proportional and integral gains are applied to the error signal to produce a control effort. Alternatively, a derivative gain may be included to form a PID controller. As mentioned above, the proportional and integral gains may be saved in memory for use in a subsequently executed PTO control mode. The control parameters may be saved as a function of time and engine coolant temperature, for example. Alternately, control parameters may be saved as a function of other engine and PTO operating conditions such as engine load and ambient air temperature, for example. In this way, several different engine and PTO operating points may be used to improve engine and PTO control since the stored control parameters may be used directly after entering PTO control mode to control the engine and PTO instead of relearning the parameters after reentering PTO control mode. Furthermore, more than one set of functions or tables may be saved in memory, based on the PTO powered apparatus, so that performance of more than one type of PTO powered apparatus may be improved. The PTO apparatus control parameters may be recalled based on apparatus number or type so that changing between PTO powered apparatuses has little effect on PTO control.

In block 404, engine load can be determined so that the engine and PTO may be controlled to the desired operating conditions. In one embodiment, controller gains from block 403 may relate engine load to an engine air amount or cylinder air amount (e.g., the theoretical amount of air a cylinder can hold at a certain temperature and pressure may be described as full load air charge or a load equal to 1, at cylinder air charges less than that at full load the ratio of the cylinder air amount to the theoretical air amount describes the cylinder or engine load, 0.25 or 25% load for example). In diesel applications engine load may be related to engine or cylinder fuel amount (i.e., the amount of fuel injected into a cylinder or cylinders during a cycle of the engine where a cycle may be defined as a number of cylinder strokes before cylinder strokes repeat). Alternatively, controller gains may relate engine load to an engine torque amount and the engine torque amount may be back to an engine or cylinder air amount at a current engine speed, for example. Engine spark advance and fuel flow may be controlled in response to the desired engine or cylinder air amount. For example, spark advance can be based on current engine speed and the desired cylinder air charge while fuel amount may be a function of engine temperature and cylinder air charge, for example. In yet another alternate embodiment, controller gains from block 403 may be related to an engine torque amount and the engine torque amount may be related to a desired fuel amount. The engine air amount may be controlled via electronic throttle 22 in response to the desired fuel amount. Further, in some diesel embodiments cylinder fuel amounts may be adjusted without adjusting a cylinder air amount. In yet another alternate embodiment, cylinder air amount may be controlled during PTO control mode via variable valve lift or electrically actuated intake valves, for example.

Feed forward control terms can be passed from block 411 to block 404 to allow the controller to converge to a desired regulation point (e.g., a desired engine speed of 2500 RPM) in a shorter period of time. The proportional and integral feedback adjustment can be combined with the feed forward control terms to provide the final actuator demand.

In step 405, adjustments to engine control actuators may be made. The final control demands from step 404 can be sent to individual actuators so that the engine and PTO may be controlled to the desired operating condition. Engine control actuators that may be used to control the engine may be comprised of, but are not limited to the following: an electronic throttle, variable lift valve mechanisms, electrically actuated valves, fuel injectors, and spark delivery devices.

Engine and PTO operating conditions may be sensed in block 409. FIG. 4 shows a sensed parameter being routed to summing junction 402. In this embodiment, actual engine speed can be used to feed back the effects of control actions taken in block 405 and of PTO loading by a PTO powered apparatus. However, in alternate embodiments, different engine and/or PTO operating conditions may be used to feed back respective control states, engine load for example. Sensed engine and PTO operating conditions may also be used to update and/or adapt feed forward control parameters, therefore FIG. 4 shows sensed engine operating conditions being routed to block 411 from block 409.

In block 411, feed forward control terms can be determined. Feed forward control terms may be initially populated based on empirical data. For example, to operate a lightly loaded engine and PTO at 2500 RPM (engine speed) may require $3.5*10^{-7}$ LB of air. However, after operating the engine with a certain PTO load it may be determined that $4.2*10^{-7}$ LB of air may be necessary to maintain the desired 2500 RPM engine speed. The incremental demand of $0.7*10^{-7}$ LB of air may be provided by the controller described in block 403. If the incremental air amount persists for a predetermined period of time, the feed forward air amount provided in block 411 may be increased or decreased as necessary to reduce the amount of effort provided by the controller of block 403. Further, limits may be placed on the amount of feed forward adaptation and the adjustment that may be made to the feed forward control term so that the feed forward term may be gradually adapted.

As will be appreciated by one of ordinary skill in the art, the routines described in FIGS. 3 and 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A system to control an internal combustion engine having a power take off device that can be coupled to the internal combustion engine, the system comprising:
   an internal combustion engine;
   a power take off device that may be coupled to said internal combustion engine, said power take off device having an output for selectively delivering at least a portion of engine power to an ancillary device; and
   a controller to adjust engine speed to a predetermined speed where a turbo charger coupled to said engine operates at higher efficiency in response to a first operator input, indicating to said operator that said engine is ready for a power take off load after reaching said predetermined speed, and controlling the power take off in response to a second operator input after said indication to said operator that said engine is ready for a power take off load.

2. The system of claim 1 wherein said controlling the power take off comprises adjusting an electronic throttle.

3. The system of claim 1 wherein said internal combustion engine is a gasoline engine.

4. The system of claim 1 wherein said internal combustion engine is a diesel engine.

5. The system of claim 1 wherein said first operator input is a request to operate said power take off device.

6. The system of claim 1 wherein said controller can exit power take off control mode when engine or power take off degradation is determined.

7. The system of claim 1 wherein said controlling the power take off controls the speed of the power take off output device.

8. The system of claim 1 wherein said controller is an electronic controller.

9. The system of claim 1 wherein said power take off device is engaged in response to said second operator input.

10. A method to control an internal combustion engine having a power take off device that can be coupled to the internal combustion engine, the method comprising:
  operating an engine and power take off device in a idle mode wherein engine speed is controlled to a first level and wherein the output of said power take off device is deactivated;
  transitioning from said idle mode to a standby mode in response to a power take off request by adjusting engine speed to a predetermined level where a turbo charger coupled to said engine operates with increased efficiency, said standby mode providing an indication to an operator that said engine is ready for a power take off load;
  transitioning from said standby mode to a power take off control mode in response to an indication of a power take off load; and
  transitioning from said power take off control mode to said standby mode when operating conditions of an exhaust system indicate said engine or power take off device may deteriorate.

11. The method of claim 10 wherein said internal combustion engine is a diesel engine.

12. The method of claim 10 wherein said internal combustion engine is a gasoline engine.

13. The method of claim 10 wherein said indication that said engine is ready for a power take off load is displayed to an operator.

14. The method of claim 10 wherein said controlling said engine comprises adjusting an electronic throttle.

15. A method to control an internal combustion engine having a power take off device that can be coupled to the internal combustion engine, the method comprising:
  operating an internal combustion engine and a power take off device between at least two modes, a first mode wherein said internal combustion engine does not deliver engine power to a power take off device output, and a second mode wherein the torque capacity of said internal combustion engine is increased from said first mode and wherein said internal combustion engine power is delivered to said power take off device output; and transitioning from said second mode to said first mode in response to an indication of degradation of an exhaust system after treatment device.

16. The method of claim 15 wherein said operating condition of said exhaust system is a temperature of an exhaust manifold.

17. The method of claim 15 wherein said operating condition of said exhaust system is an exhaust pressure.

18. The method of claim 15 wherein said power take off device is a transmission power take off device.

19. A method to control an internal combustion engine having a power take off device that can be coupled to the internal combustion engine, the method comprising:
  operating an internal combustion engine and a power take off device between at least two modes, a first mode wherein said internal combustion engine does not deliver engine power to a power take off device output, and a second mode wherein said internal combustion engine torque capacity is increased from said first mode and wherein said internal combustion engine can deliver power to said power take off device output; and
  transitioning from said first mode to said second mode or from said second mode to said first mode in response to an operating condition of an exhaust gas after treatment device.

20. The method of claim 19 wherein said exhaust gas after treatment device is located in an exhaust system that channels exhaust gases away from said engine.

21. The method of claim 19 wherein said exhaust gas after treatment device is comprised of at least one of a catalyst, a hydrocarbon trap, a particulate filter, a selective reduction catalyst, or a NOx trap.

22. The method of claim 19 wherein said operating condition of said exhaust gas after treatment device is a temperature of said exhaust gas after treatment device.

23. The method of claim 19 wherein said operating condition of said exhaust gas after treatment device is a pressure drop across said exhaust gas after treatment device.

24. The method of claim 19 wherein said power take off device is a transmission power take off device.

25. A computer readable storage medium having stored data representing instructions executable by a computer to operate an internal combustion engine of a vehicle, said storage medium comprising:
  instructions for selecting and operating said internal combustion engine and a power take off device in a first mode, a second mode, and a third mode in response to operating conditions, said first mode comprising operating said internal combustion engine without delivering engine power to the output of said output power take off device, said second mode comprising a power take off request and operating said internal combustion engine at a higher torque capacity than when operating in said first mode and while not delivering engine power to the output of said power take off device, and said third mode comprising operating said internal combustion engine while delivering engine power to said output and responding to a power take off speed request of an operator; and
  instructions for transitioning from said first to said second mode and from said second mode to said third mode based on whether a power take off load is engaged.

* * * * *